(12) United States Patent
Hoffmann

(10) Patent No.: US 10,547,639 B2
(45) Date of Patent: Jan. 28, 2020

(54) SDN SECURITY

(71) Applicant: NOKIA SOLUTIONS AND NETWORKS GMBH & CO. KG, Munich (DE)

(72) Inventor: Klaus Hoffmann, Munich (DE)

(73) Assignee: NOKIA SOLUTIONS AND NETWORKS GMBH & CO. KG, Munich (DE)

( * ) Notice: Subject to any disclaimer, the term of this patent is extended or adjusted under 35 U.S.C. 154(b) by 225 days.

(21) Appl. No.: 15/580,327

(22) PCT Filed: Jun. 10, 2016

(86) PCT No.: PCT/EP2016/063274
§ 371 (c)(1),
(2) Date: Dec. 7, 2017

(87) PCT Pub. No.: WO2016/198586
PCT Pub. Date: Dec. 15, 2016

(65) Prior Publication Data
US 2018/0302439 A1    Oct. 18, 2018

(30) Foreign Application Priority Data
Jun. 10, 2015 (EP) .................. 15171343

(51) Int. Cl.
*H04L 29/06* (2006.01)
*H04L 29/12* (2006.01)
*H04L 29/08* (2006.01)

(52) U.S. Cl.
CPC .......... *H04L 63/16* (2013.01); *H04L 61/2015* (2013.01); *H04L 63/1458* (2013.01); *H04L 67/42* (2013.01); *H04L 69/324* (2013.01)

(58) Field of Classification Search
None
See application file for complete search history.

(56) References Cited

U.S. PATENT DOCUMENTS 7,032,034 B1 *   4/2006   Tenneti ............... H04L 41/0896
                                                        702/122
7,430,205 B2 *   9/2008   Ota .................... H04L 12/2856
                                                        370/393
(Continued)

FOREIGN PATENT DOCUMENTS

WO    2014083449 A1    6/2014
WO    2014127517 A1    8/2014

OTHER PUBLICATIONS

Flauzac et al., "SDN based architecture for IoT and improvement of the security", 29th International Conference on Advanced Information Networking and Applications Workshops, 978-1-4799-1775-4/15, IEEE 2015.*

(Continued)

*Primary Examiner* — Piotr Poltorak
(74) *Attorney, Agent, or Firm* — Squire Patton Boggs (US) LLP

(57) ABSTRACT

The present invention provides apparatuses, methods, computer programs, computer program products and computer-readable media regarding SDN security. The method comprises checking whether messages in the user plane comply to a preconfigured rule, and if it is determined that the messages comply to the preconfigured rule, checking whether a number of specific signaling messages related to address allocation that are sent to a controller has reached a predetermined threshold, and if the predetermined threshold has been reached, throttling transmission of the specific signaling messages to the controller.

13 Claims, 11 Drawing Sheets

(56) References Cited

U.S. PATENT DOCUMENTS

| | | | | |
|---|---|---|---|---|
| 7,684,394 | B1* | 3/2010 | Cutbill | H04L 29/12066 370/389 |
| 9,071,576 | B1* | 6/2015 | Earl | H04L 63/0236 |
| 2004/0236947 | A1* | 11/2004 | Chaudhuri | H04L 63/08 713/169 |
| 2005/0086502 | A1* | 4/2005 | Rayes | H04L 63/20 713/189 |
| 2005/0122973 | A1* | 6/2005 | Kim | H04L 41/0896 370/389 |
| 2005/0128945 | A1* | 6/2005 | Kuo | H04L 47/10 370/230 |
| 2005/0128946 | A1* | 6/2005 | Murakami | H04L 12/2856 370/230 |
| 2005/0232147 | A1* | 10/2005 | Bang | H04L 1/1887 370/229 |
| 2007/0140121 | A1* | 6/2007 | Bowman | H04L 63/101 370/230 |
| 2008/0187138 | A1* | 8/2008 | Funnell | H04L 47/34 380/270 |
| 2009/0116503 | A1* | 5/2009 | Sebastian | H04L 47/10 370/412 |
| 2009/0327844 | A1* | 12/2009 | Suneya | H04L 1/0009 714/776 |
| 2012/0110665 | A1* | 5/2012 | Abdul | H04L 63/1425 726/23 |
| 2014/0122395 | A1* | 5/2014 | Nahum | H04L 41/0886 706/13 |
| 2015/0281085 | A1* | 10/2015 | Phaal | H04L 47/12 370/235 |
| 2015/0341235 | A1 | 11/2015 | Ni et al. | |

OTHER PUBLICATIONS

Hampel et al., "Applying Software-Defined Networking to the Telecom Domain", 16th IEEE Global Internet Syposium 978-1-4673-1017-8/13 IEEE, 2013.*

Shin et al, AVANT-GUARD: Scalable and Vigilant Switch Flow Management in Software-Defined Networks, ACM 978-1-4503-2477-9/13/11, CCS'13, Nov. 4-8, 2013.*

International Search Report & Written Opinion dated Sep. 15, 2016 corresponding to International Patent Application No. PCT/EP2016/063274.

Seungwon Shin et al., "AVANT-GUARD: Scalable and Vigilant Switch Flow Management in Software-Defined Networks," Computer & Communications Security, ACM, Nov. 4, 2013, pp. 413-424, XP058034060.

3GPP TS 29.061 V12.6.0 (Jun. 2014), Technical Specification, 3rd Generation Partnership Project; Technical Specification Group Core Network and Terminals; Interworking between the Public Land Mobile Network (PLMN) supporting packet based services and Packet Data Networks (PDN) (Release 12), Jun. 2014.

3GPP TS 29.212 V13.1.0 (Mar. 2015), Technical Specification, 3rd Generation Partnership Project; Technical Specification Group Core Network and Terminals; Policy and Charging Control (PCC); Reference points (Release 13), Mar. 2015.

3GPP TS 29.274 V13.1.0 (Mar. 2015), Technical Specification, 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3, (Release 13), Mar. 2015.

Network Functions Virtualisation—An Introduction, Benefits, Enablers, Challenges & Call for Action—Introductory White Paper, ETSI, Issue 1, 2012.

S. Alexander et al., "DHCP Options and BOOTP Vendor Extensions," Network Working Group, RFC 1533, Oct. 1993.

R. Droms, "Dynamic Host Configuration Protocol," Network Working Group, RFC 2131, Mar. 1997.

R. Droms et al., "Dynamic Host Configuration Protocol for IPv6 (DHCPv6)," Network Working Group, RFC 3315, Jul. 2003.

3GPP TS 24.008 V13.1.0 (Mar. 2015), Technical Specification, 3rd Generation Partnership Project; Technical Specification Group Core Network and Terminals; Mobile radio interface Layer 3 specification; Core network protocols; Stage 3 (Release 13), Mar. 2015.

3GPP TS 27.007 V13.0.0 (Mar. 2015), Technical Specification, 3rd Generation Partnership Project; Technical Specification Group Core Network and Terminals; AT command set for User Equipment (UE) (Release 13), Mar. 2015.

3GPP TS 29.060 V13.0.0 (Mar. 2015), Technical Specification, 3rd Generation Partnership Project; Technical Specification Group Core Network and Terminals; General Packet Radio Service (GPRS); GPRS Tunnelling Protocol (GTP) across the Gn and Gp interface (Release 13), Mar. 2015.

3GPP TS 23.401 V13.1.0 (Dec. 2014), Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 13), Dec. 2014.

3GPP TS 23.402 V13.1.0 (Mar. 2015), Technical Specification, 3rd Generation Partnership Project; Technical Specification Group Services and System Aspects; Architecture enhancements for non-3GPP accesses (Release 13), Mar. 2015.

* cited by examiner

SDN SECURITY

FIELD OF THE INVENTION

The present invention relates to apparatuses, methods, systems, computer programs, computer program products and computer-readable media regarding SDN (Software Defined Networking) security.

The present invention is applicable to various protocols like, for example, DHCP (Dynamic Host Configuration Protocol), RADIUS (Remote Authentication Dial-In User Service), L2TP (Layer 2 Tunneling Protocol) and PPP (Point-to-Point Protocol) etc.

BACKGROUND OF THE INVENTION

The Dynamic Host Configuration Protocol (DHCP) is a protocol for managing and dynamically assigning IP (Internet Protocol) addresses to stations in a TCP/IP (Transmission Control Protocol/Internet Protocol) network. DHCP is a client-server-architecture and a process as illustrated in FIG. 1 is performed between the client and the server for assigning an IP address (without considering GTP (GPRS (General Packet Radio Service) Tunneling Protocol).

As shown in FIG. 1, the client sends a broadcast message 'DHCP-Discovery' to the server in step S11 which in turn responds in step S12 with a 'DHCP-Offer' message including an proposal for an IP address and other relevant parameters. Then, the client broadcasts a "DHCP-Request" message in step S13 for confirming/requesting the IP address offered in the "DHCP-Offer" message and the sever responds in step S14 with a "DHCP-ACK" message containing the configuration parameters for the requesting client. Details in this regard are described in the document RFC (Request for Comments) 2131.

FIG. 2 is a signaling diagram (cf. 3GPP TS (Technical Specification) 29.061) illustrating another example of an address allocation using DHCPv4 between a terminal equipment (TE) acting as the DHCP client and an Intranet or ISP (Internet Service Provider) acting as the DHCP server. FIG. 2 further shows a mobile terminal (MT), a SGSN (Serving GPRS Support Node) and a GGSN (Gateway GPRS (General Packet Radio Service) Support Node) acting as a DHCP relay agent. The following description of steps 1) to 12) of FIG. 2 is taken from TS 29.061. For details in this regard, reference is made to this document.

In step S21, the TE (Terminal Equipment) and MT (Mobile Terminal) exchange several AT (Attention, as described for example in 3GPP TS 27.007) commands carrying the QoS (Quality of Service) and other parameters requested by the TE, and requesting the activation of a PDP (Packet Data Protocol) context of PDP type IP. The TE selects the APN (Access Point Name) of the configured Intranet/ISP offering a DHCP service, or the APN consisting of the Reserved Service Label for DHCP that the user has subscribed to. In the latter case the TE will be connected to a PLMN (Public Land Mobile Network) operator-configured service provider offering a DHCP service (according to the APN selection rules).

In step S22, the MT sends the Activate PDP Context Request message to the SGSN with an empty PDP address field.

In step S23, the SGSN selects a GGSN based on the APN requested by the MS (Mobile Station), constituted by the TE and the MT, and sends a Create PDP (Packet Data Protocol) Context Request message to that GGSN. The GGSN replies with a Create PDP Context Response message. If the GGSN has not been configured by the operator to use external PDN (Packet Data Network) address allocation with DHCP for the requested APN, the cause shall be set to 'Service not supported'. No IP address is assigned at this point; the PDP address returned by the GGSN is set to 0.0.0.0, indicating that the IP address is not yet assigned and shall be negotiated by the TE with the Intranet/ISP after the PDP context activation procedure.

In step S24, depending on the cause value received in the Create PDP Context Response, the SGSN sends either an Activate PDP Context Accept or an Activate PDP Context Reject back to the MT. In case of a successful activation, the PDP context is established with the PDP address set to 0.0.0.0.

In step S25, upon reception of the Activate PDP Context Accept, the MT sends an AT response to the TE that acknowledges the completion of the PDP context activation procedure.

In step S26, the TE sends a DHCPDISCOVER message with the IP destination address set to the limited broadcast address (all 1 s). The GGSN will pass the DHCPDISCOVER to the DHCP relay agent which will relay the request to the DHCP server configured for the APN of the PDP context. If more than one DHCP server is configured for a given APN, the request will be sent to all of them. The DHCP relay agent will add enough information to the DHCPDISCOVER message to be able to relay the replies back to the MS.

In step S27, DHCP servers receiving the DHCPDISCOVER request reply by sending a DHCPOFFER message including an offered IP address. The DHCP relay agent forwards the replies to the proper MS.

In step S28, the TE chooses one of the possibly several DHCPOFFERs and sends a DHCPREQUEST confirming its choice and requesting additional configuration information. The relay agent relays the DHCPOFFER as explained in step S26.

In step S29, the selected DHCP server receives the DHCPREQUEST and replies with a DHCPACK containing the configuration information requested by the TE. The DHCP relay agent relays the DHCPACK to the TE.

In step S210, the DHCP relay agent passes the allocated IP address to the GGSN which stores it in the corresponding PDP context. The GGSN then initiates a PDP context modification procedure by sending an Update PDP Context Request to the appropriate SGSN with the End User Address information element set to the allocated IP address.

In step S211, the SGSN sends a Modify PDP Context Request to the MT with the allocated IP address in the PDP Address information element. The MT acknowledges by sending a Modify PDP Context Accept to the SGSN.

In step S212, the SGSN sends an Update PDP Context Response to the GGSN. The PDP context has been successfully updated with the allocated IP address.

Regarding 3GPP, in case the UE requested the IP address allocation via DHCP, the GTP-U (GPRS Tunneling Protocol User Plane) carries both the DHCP signaling traffic and the payload of the traffic generated by the UE.

Further, according to today's OpenFlow specification, it is in general possible to send all the DHCP messages being received in the GTP-U of the EPC GW (Evolved Packet Core Gateway) up to the controller in an SDN (Software Defined Networking) environment.

Thus, in SDN, all DHCP messages being received in the user plane may be sent to a SDN controller. However, this raises security concerns as the SDN controller can be flooded by DoS (Denial-of-Service) attacks.

Thus, a solution is required to secure the controller to ensure a carrier grade behavior of the network such that other users/subscriber of the customer's network and of course the networks itself are not impacted by a corresponding attack.

As the DHCP protocol is UE originated, if the UE requested DHCP via the PCO (Protocol Configuration Option, see 3GPP TS 24.008, either via the S5/S8 interface TS 29.274 GTPv2 control Plane (4G) or via the Gn interface TS 29.060 GTPv1 control Plane (3G)), the UE can impact the network SDN controller.

In former times, the SDN controller did not exist as such. Therefore the threat that the operators network is potentially attacked and damaged (due to that especially the SDN controller may not be able to control the flows in the assigned switches in the network as appropriate anymore) is newly created by the SDN approach. Up to now, before the SDN was introduced, it was not necessary to take care as there was no threat.

Currently, either all DHCP messages are sent to the controller or none, but the PGW-C (Packet Data Network Gateway control plane) needs to have the IP address which is allocated/assigned to the UE. So in the SDN environment, there are conflicting requirements which are not solved today.

However, it is noted that DHCP is just an example. The above described issues and the present invention is also applicable to other protocols like for example, RADIUS (Remote Authentication Dial-In User Service), L2TP (Layer 2 Tunneling Protocol) and PPP (Point-to-Point Protocol) etc.

FIG. 9 is a signaling diagram illustrating an example of a successful PDP context activation, as defined in 3GPP TS 29.061.

In the example shown in FIG. 9, the MS (Mobile Station) is given an address belonging to the Intranet/ISP addressing space. The address is given either at subscription in which case it is a static address or at PDP context activation in which case it is a dynamic address. This address is used for packet forwarding within the GGSN and for packet forwarding on the Intranet/ISP. This requires a link between the GGSN and an address allocation server, such as AAA (Authentication, Authorization and Accounting), or DHCP, belonging to the Intranet/ISP.

The communication between the Packet Domain and the Intranet/ISP may be performed over any network, even an insecure e.g. the Internet. In case of an insecure connection between the GGSN and the Intranet/ISP there may be a specific security protocol in between. This security protocol is defined by mutual agreement between PLMN (Public Land Mobile Network) operator and Intranet/ISP administrator.

In step S91, the TE sends an AT-command to the MT to set up parameters.

In step S92, the MT sends the Activate PDP context request message to the SGSN which sends the Create PDP context request message to the chosen GGSN in step S93.

The GGSN deduces from the APN
  the server(s) to be used for address allocation and authentication;
  the protocol such as RADIUS, DHCP or L2TP to be used with this/those server(s);
  the communication and security feature needed to dialogue with this/those server(s) e.g. tunnel, IPSec security association, dial-up connection (using possibly PPP).
As an example the GGSN may use one of the following options:
  RADIUS for authentication and IP-address allocation. The AAA server responds with either an Access-Accept or an Access-Reject to the RADIUS client in the GGSN;
  RADIUS for authentication and DHCP for host configuration and address allocation. The AAA server responds with either an Access-Accept or an Access-Reject to the RADIUS client in the GGSN. After a successful authentication, the DHCP client discovers the DHCP server(s) in the ISP/Intranet and receives host configuration data;
  L2TP for forwarding PPP frames to a L2TP Network Server.

In step S94, the GGSN sends back to the SGSN a Create PDP Context Response message. Depending on the cause value received in the Create PDP Context Response the SGSN may either send the Activate PDP Context Accept message or send the Activate PDP Context Reject message to the MS in step S95.

In step S96, the MT responds with an AT-response that may indicate whether the context activation was successful or not. In the case of a non-successful context activation the response may also indicate the cause.

In case of successful context activation, the TE will start its PPP protocol after the LLC (Logical Link Control) link has been established. The LCP (Link Control Protocol), Authentication and NCP (Network Control Protocol) negotiations are then carried out in step S97 and RADIUS/DHCP or L2TP negotiation is carried out in step S98.

FIG. 10 describes an example of RADIUS message flows between a GGSN and an Authentication, Authorization and Accounting (AAA) server for the case where PPP is terminated at the GGSN, as described in 3GPP TS 29.061. A detailed description thereof is omitted here and reference is made to TS 29.061 in this regard.

SUMMARY OF THE INVENTION

It is therefore an object of the present invention to overcome the above mentioned problems and to provide apparatuses, methods, systems, computer programs, computer program products and computer-readable media regarding SDN (Software Defined Networking) security.

According to an aspect of the present invention there is provided a method comprising:
  checking whether messages in the user plane comply to a preconfigured rule, and
  if it is determined that the messages comply to the preconfigured rule,
  checking whether a number of specific signaling messages related to address allocation that are sent to a controller has reached a predetermined threshold, and
  if the predetermined threshold has been reached,
  throttling transmission of the specific signaling messages to the controller.

According to another aspect of the present invention there is provided a method comprising:
  evaluating whether a request for address allocation fulfills a predetermined condition,
  if it is determined that the request fulfills the predetermined condition,
  causing another network element in a user plane to check whether messages in the user plane comply to a preconfigured rule, and
  causing the another network element in the user plane to throttle specific signaling messages to a controller if the messages in the user plane comply to the preconfigured rule.

According to another aspect of the present invention there is provided an apparatus for use in a network element in a user plane, comprising:
  at least one processor,
  and
  at least one memory for storing instructions to be executed by the processor, wherein
  the at least one memory and the instructions are configured to, with the at least one processor, cause the apparatus at least to perform:
  checking whether messages in the user plane comply to a preconfigured rule, and
  if it is determined that the messages comply to the preconfigured rule,
  checking whether a number of specific signaling messages related to address allocation that are sent to a controller has reached a predetermined threshold, and
  if the predetermined threshold has been reached,
  throttling transmission of the specific signaling messages to the controller.

According to another aspect of the present invention there is provided an apparatus for use in a network element, comprising:
  at least one processor,
  and
  at least one memory for storing instructions to be executed by the processor, wherein
  the at least one memory and the instructions are configured to, with the at least one processor, cause the apparatus at least to perform:
  evaluating whether a request for address allocation fulfills a predetermined condition,
  if it is determined that the request fulfills the predetermined condition,
  causing another network element in a user plane to check whether messages in the user plane comply to a preconfigured rule, and
  causing an indication to the another network element in the user plane to throttle specific signaling messages to a controller if the messages in the user plane comply to the preconfigured rule.

According to another aspect of the present invention there is provided a computer program product comprising code means adapted to produce steps of any of the methods as described above when loaded into the memory of a computer.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

According to a still further aspect of the present invention there is provided an apparatus comprising:
  means for checking whether messages in the user plane comply to a preconfigured rule, and
  if it is determined that the messages comply to the preconfigured rule,
  means for checking whether a number of specific signaling messages related to address allocation that are sent to a controller has reached a predetermined threshold, and
  if the predetermined threshold has been reached,
  means for throttling transmission of the specific signaling messages to the controller.

According to a still further aspect of the present invention there is provided an apparatus comprising:
  means for evaluating whether a request for address allocation fulfills a predetermined condition,
  if it is determined that the request fulfills the predetermined condition,
  means for causing another network element in a user plane to check whether messages in the user plane comply to a preconfigured rule, and
  means for causing the another network element in the user plane to throttle specific signaling messages to a controller if the messages in the user plane comply to the preconfigured rule.

BRIEF DESCRIPTION OF THE DRAWINGS

These and other objects, features, details and advantages will become more fully apparent from the following detailed description of aspects/embodiments of the present invention which is to be taken in conjunction with the appended drawings, in which.

DETAILED DESCRIPTION

Figure 1:
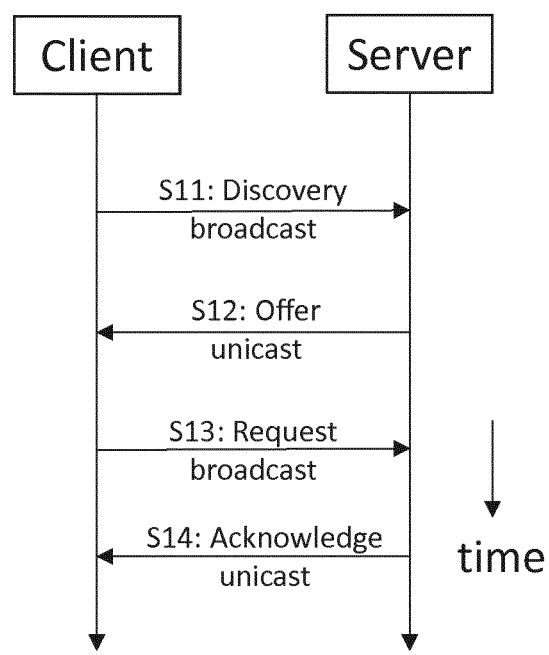
FIG. 1 is a signaling diagram illustrating a basic example of an address allocation using DHCP between a client and a server.
Figure 2:
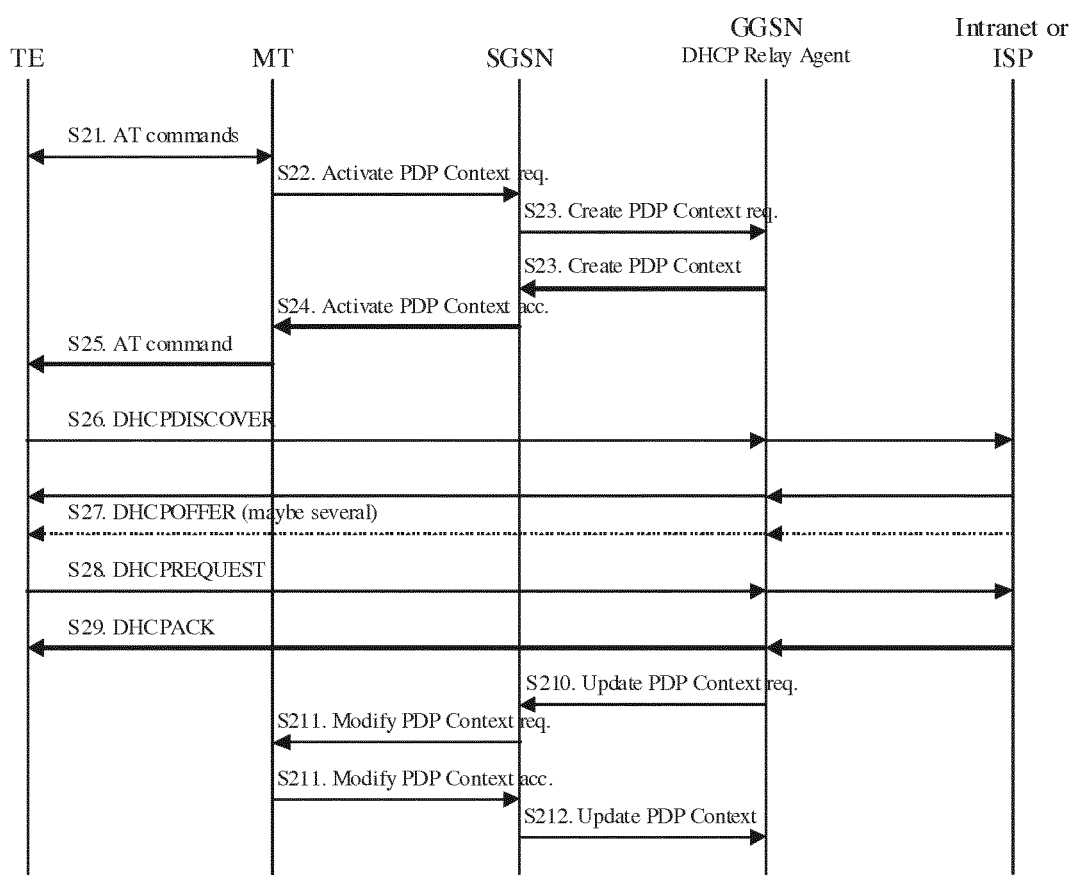
FIG. 2 is a signaling diagram illustrating another example of an address allocation using DHCPv4 between a terminal equipment (TE) acting as the DHCP client and an Intranet or ISP (Internet Service Provider) acting as the DHCP server.

In the following, some example versions of the disclosure and embodiments of the present invention are described with reference to the drawings. For illustrating the present invention, the examples and embodiments will be described in connection with a cellular communication network based on a 3GPP based communication system, for example an LTE/LTE-A based system. However, it is to be noted that the present invention is not limited to an application using such types of communication systems or communication networks, but is also applicable in other types of communication systems or communication networks, like for example 5G communication networks or fixed networks and the like.

The following examples versions and embodiments are to be understood only as illustrative examples. Although the specification may refer to "an", "one", or "some" example version(s) or embodiment(s) in several locations, this does not necessarily mean that each such reference is to the same example version(s) or embodiment(s), or that the feature only applies to a single example version or embodiment. Single features of different embodiments may also be combined to provide other embodiments. Furthermore, words "comprising" and "including" should be understood as not limiting the described embodiments to consist of only those features that have been mentioned and such example versions and embodiments may also contain features, structures, units, modules etc. that have not been specifically mentioned.

The basic system architecture of a communication network where examples of embodiments of the invention are applicable may comprise a commonly known architecture of one or more communication systems comprising a wired or wireless access network subsystem and a core network. Such an architecture may comprise one or more communication network control elements, access network elements, radio access network elements, access service network gateways or base transceiver stations, such as a base station (BS), an access point or an eNB (evolved Node B), which control a respective coverage area or cell and with which one or more communication elements or terminal devices such as a UE (User Equipment) or another device having a similar function, such as a modem chipset, a chip, a module etc., which can also be part of a UE or attached as a separate element to a UE, or the like, are capable to communicate via one or more channels for transmitting several types of data. Furthermore, core network elements such as gateway network elements, policy and charging control network elements, mobility management entities, operation and maintenance elements, and the like may be comprised.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a communication element or terminal device like a UE and a communication network control element like a radio network controller, besides those described in detail herein below.

The communication network is also able to communicate with other networks, such as a public switched telephone network or the Internet. The communication network may also be able to support the usage of cloud services. It should be appreciated that BSs and/or eNBs or their functionalities may be implemented by using any node, host, server, cloud, data center or access node and forwarding node etc. entity suitable for such a usage.

Further, the present invention is also applicable to Cloud Computing, Virtualization and Industry Standard High Volume Servers.

In this regard, Cloud Computing and Industry Standard High Volume Servers are defined in the document "Network Functions Virtualization—Introductory White Paper", ETSI (European Telecommunication Standards Institute) as follows.

Cloud Computing

Network Functions Virtualisation will leverage modern technologies such as those developed for cloud computing. At the core of these cloud technologies are virtualisation mechanisms: hardware virtualisation by means of hypervisors and/or (Docker) containers or similar, as well as the usage of virtual Ethernet switches (e.g. vswitch) for connecting traffic between virtual machines and physical interfaces. For communication-oriented functions, high-performance packet processing is available through high-speed multi-core CPUs (Central Processing Units) with high I/O bandwidth, the use of smart Ethernet NICs for load sharing and TCP Offloading, and routing packets directly to Virtual Machine memory, and poll-mode Ethernet drivers (rather than interrupt driven, for example Linux NAPI (New Application Programming Interface) and Intel's DPDK (Data Plane Development Kit)). Cloud infrastructures provide methods to enhance resource availability and usage by means of orchestration and management mechanisms, applicable to the automatic instantiation of virtual appliances in the network, to the management of resources by assigning virtual appliances to the correct CPU core, memory and interfaces, to the re-initialisation of failed VMs (Virtual Machines), to snapshot VM states and the migration of VMs. Finally, the availability of open APIs for management and data plane control, like OpenFlow, OpenStack, OpenNaaS or OGF's NSI, provide an additional degree of integration of Network Functions Virtualisation and cloud infrastructure.

Industry Standard High Volume Servers

The use of industry standard high volume servers is a key element in the economic case for Network Functions Virtualisation. Network Functions Virtualisation leverages the economies of scale of the IT industry. An industry standard high volume server is a server built using standardised IT components (for example x86 architecture) and sold in the millions. A common feature of industry standard high volume servers is that there is competitive supply of the subcomponents which are interchangeable inside the server.

Furthermore, the described network elements and communication devices, such as terminal devices or user devices like UEs, communication network control elements of a cell, like a BS or an eNB, access network elements like APs (Access Points) and the like, network access control elements like AAA (Authentication, Authorization and Accounting) servers and the like, as well as corresponding functions as described herein may be implemented by software, e.g. by a computer program product for a computer, and/or by hardware. In any case, for executing their respective functions, correspondingly used devices, nodes or network elements may comprise several means, modules, units, components, etc. (not shown) which are required for control, processing and/or communication/signaling functionality. Such means, modules, units and components may comprise, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means comprising e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It is an object of some example versions of the present invention to protect the PGW-C and the SDN controller from flooding, and simultaneously supporting IP address delivery as needed at the PGW-C for functions like (online) charging and traffic steering in, for instance, the service chaining/TDF (Traffic Detection Function) environment.

Depending on dedicated events/trigger information such as e.g. control plane information, the user plane is directed to throttle the signalling (DHCP) messages being sent up via the OpenFlow message "Packet IN" up to the SDN controller. By this, the SDN controller is protected against flooding while still being informed about the IP address needed at the PGW-C application riding on top of the SDN controller.

Alternatively, the OpenFlow protocol may be changed such that only the IP address (or whatever information element may be of interest to the PGW-C (or whatever application)) may be reported to the SDN controller.

According to the current OpenFlow specification, it is already possible that the DHCP protocol can be forwarded via the OpenFlow "Packet IN" message to the OF Controller and/or the PGW-C, where the Controller or the PGW-C, after manipulation of the received information, could instruct the user plane via the OpenFlow "Packet Out" message to forward the DHCP message. This ability to forward DHCP messages up to the OpenFlow Controller (OFC) and to the PGW-C is already possible since the current OpenFlow Protocol allows for the matching of the UDP (User Datagram Protocol) ports 67 and 68 (denoting DHCP).

However, sending all DHCP messages up to the SDN controller raises security concerns as the SDN controller can be flooded by DoS attacks, as already indicated above.

Therefore, according to some example versions of the present invention, the following measures are suggested.

DHCPv4

Instead of completely throttling the whole GTP-U traffic, it is suggested to separately apply a scan to the normal GTP-U payload and the DHCP traffic carried in the user plane if the UE requested the IPv4 address allocation via DHCPv4 within the PCO (Protocol Configuration Option) in the Create session request message or the "PDN connectivity" message, as defined in the 3GPP TS 29.274, where the PGW-C/SDN-C (Software defined networking controller) is suggested to request the DHCP/RADIUS throttling. For instance, if the PCO Additional parameters list contains the 000BH (IPv4 address allocation via DHCPv4) the UE intends to allocate its IPv4 address itself via the GTP-U payload after the GTP Tunnel establishment, and in that case the SDN Controller/PGW-C may expose itself to a security risk where the UE may possibly flood the SDN controller (e.g via OPenFLow or Forces) with high frequently sent DHCPv4 messages.

Thus, the PCO is evaluated and only in case the UE requests IP address allocation via DHCPv4 in the PCO or IPv6 in the NAS (Non-Access Stratum), the PGW-C SDN controller is interested in the IP address and the lease time, and a security risk is created by being notified by the UE signaling being sent up to the PGW-C/SDN controller.

It is noted that the PGW-C as defined in LTE/4G is again just an example, and the function corresponding to the PGW in 3G is the GGSN. The PGW is addressed via the S5/S8 interface (cf. 3GPP TS 29.274 GTPv2 control Plane (4G)), whereas the GGSN is addressed via the Gn interface (cf. 3GPP TS 29.060 GTPv1 control Plane (3G)).

Further, it is noted that not only the PGW and the GGSN may have a C and U plane split, but also the SGW (Serving Gateway). This is described fro example in 3GPP TS 23.402, chapter 4.7.1, "Figure 4.7.1-1: IPv4 Address Allocation using DHCP with DHCP Server Collocated with the PDN GW and DHCP Relay in the Serving GW" and/or chapter 4.7.6, "Figure 4.7.6-1: Prefix Delegation with DHCP Server Collocated with the PDN GW and DHCP Relay in the Serving GW when using PMIP-based S5/S8".

The DHCP signaling messages are sent and evaluated on the payload level only, as the DHCP rides on IP and GTP level respectively in the PGW-U.

For that an alternative action within the OpenFlow protocol is suggested to be defined and signaled to the user plane.

The PGW-C sends MOD-Flow or ADD-FLOW for the GTP Tunnel in question (as for instance with the evaluation of the PCO) to the OFC Controller with new additional actions for BOOTREQUEST/BOOTREPLY of the DHCP/BOOTP protocol.

The OF controller forwards this to the corresponding enhanced OpenFlow switch (PGW-U). The enhanced OpenFlow switch evaluates the new actions once an
- DHCP discovery (BOOTREQUEST), or
- DHCP offer (BOOTREPLY), or
- DHCP request (BOOTREQUEST), or
- DHCP ack (BOOTREPLY), or
- DHCP information (BOOTREQUEST), or
- DHCP releasing (BOOTREQUEST)

is received later on.

Correlation of GTP-U Tunnel to the Different Legs to the Multiple DHCP Servers

For instance the PGW-U keeps the DHCP discovery message, according to the requirement of the actions as associated with the match of the DHCP discovery message, within its realm in order to manipulate the received message such that it is rewritten to be an outgoing DHCP discovery message to be sent to the DHCP server.

For instance the PGW-U is instructed to insert the IP address of the DHCP relay agent into the giaddr field and to replace an own new transaction ID into the "XID" field of the DHCP Discovery message. On receipt of the DHCP offer message (from each DHCP server) the PGW-U is to replace the received XID with the value of value received in the DHCP Discovery message sent by the client into the "XID" field.

The PGW-U is instructed to perform the same action on receipt of the DHCP request message and the DHCP Acknowledge message.

If the PGW-U is connected to multiple DHCP servers the PGW-U is instructed to duplicate the DHCP discovery message to several DHCP servers.

As it is not a good idea that the OF Controller is to mandated to determine dynamically the transaction ID towards the DHCP server for each XID value and to instruct the PGW-U for each XID in a very detail, it is much better that the PGW-U DHCP relay keeps the correlation between DHCP client and DHCP server on the U-plane. For that, it is suggested that the PGW-U creates/maintains a hashing/mapping table list of incoming XID and GTP TEID of the client to be correlated with the outgoing XID per IP address of the corresponding DHCP server.

If this is not applied in the PGW-U it is suggested that the PGW-U forwards the said XID to the controller and that the controller instructs the PGW-U by which XID value it is to be replaced. However, as said before, this is time consuming and burdens the OF controller unnecessarily.

If the DHCP message is coming from the client (i.e. from the GTP side) the IP address of the DHCP relay agent is to be inserted (i.e. the "OP" field carries the indication BOOTREQUEST).

If the DHCP message is coming from the server (i.e. the IP side) the IP address is not to be modified (i.e. the "OP" field carries the indication BOOTREPLY).

Therefore, the following OpenFlow matching rules are suggested:

XID (carries the transaction ID);
giaddr (carries the IP address of the DHCP relay agent);
yiaddr (carries the IP address of the UE (recently assigned));
ciaddr (carries the IP address client of the UE (formerly assigned/selected)).

Therefore, the following new actions valid for the OpenFlow protocol are invented in order to be able to rewrite a DHCP message.

New proprietary actions specified within OpenFlow:

TABLE 1

New actions specified within OpenFlow

| Action | Description |
| --- | --- |
| Swap IP address | Mutually exchange/swap the contents of source and destination IP address |
| Swap giaddr (with IP address of PGW-U DHCP relay agent) | exchange/swap the content of giaddr with own IP address (as instructed by the controller) |
| Swap XID (with new value) | Create/maintain and consult new invented internal table holding the XIDx and GTP-TEID addresses of the client correlated via hashing with the XIDy towards the DHCP servers<br>Other fields do not need to be modified |

It is suggested that the above new OpenFlow actions are associated with the matching rule for the receipt of the DHCP message.

The resulting protocol stack mapping between GTP-U and DHCP in PGW-U is shown in the following.

TABLE 2

Mapping from S5/S8 to SGi

| S5/S8 | | SGi |
| --- | --- | --- |
| DHCP (XID) | Direction Client-> Server | DHCP relay agent<br>DHCP (XID, giaddr) |
| XIDx | | XIDy (hash/table mapping from XIDx + TEID-GTP)<br>Giaddr (IP Addr of DHCP relay agent) |
| UDP | | UDP |
| IP | | IP (Giaddr) |
| TEID-GTP | | |
| UDP | | |
| IP | | |

TABLE 3

Mapping from SGi to S5/S8

| DHCP (XID) | Direction Server <- Client | DHCP (XID, giaddr) |
| --- | --- | --- |
| XID (de-hash/table mappng from XIDy) | | XIDy |
| | | Giaddr |
| UDP | | UDP |
| IP | | IP (Giaddr) |
| TEID-GTP (de-hash/table mapping from XIDy) | | |
| UDP | | |
| IP | | |

Instead of listing the above atomic actions in the matching rules, it is further suggested to aggregate them into a compound list, to which it might be referenced with a shorter reference in order to even save bytes on the openflow signaling channel between the OFC (OpenFlow Controller) and the PGW-U (OpenFlow switch).

IP Address Reporting

Furthermore the PGW-U is requested to report the assigned IP address to the OFC and PGW-C. Additionally a notification is suggested to be requested by the OpenFlow controller or PGW-C such that when the leasing time of the allocated IP address expired or a renewal of the IP address was rejected or the IP address was removed, the PGW-U reports this to the controller as well.

According to 3GPP TS 29.061 V12.6.0 (cf. chapter 13) it is requested that the bearer is to be released due to the following conditions.

a) if the DHCP lease expires;
b) if the DHCP renewal is rejected by the DHCP server;
c) if the IP address is changed during the renewal process.
Usually when the lease is renewed, the IP address remains unchanged. However, if for any reason (e.g. poor configuration of the DHCP server), a different IP address is allocated during the lease renewal process the associated bearer shall be released.

Note: Additionally the allocation and the de-allocation of the IP Address assigned or de-assigned to or from the UE may be requested by the PCRF (Policy and Charging Rule Function) from the PCEF (Policy and Charging Enforcement Function)/PGW (see 3GPP TS 29.212 chapter 4.5.3 and 4b.5.8) such that the PCRF is able to notify the TDF (Traffic Detection Function) about the corresponding changes.

In order to be able to report the IP address being allocated to the UE it is suggested that the PGW-C instructs the PGW-U via the OpenFlow controller to check the content of both the "ciaddr" and the "yiaddr" fields in any BOOTREPLY message (i.e. sent from the server to the client). If the content of "ciaddr" is not equal to "0" then the content of the "yiaddr" is to be reported to the PGW-C via OpenFlow as it contains the leased IP address.

As a further optimisation the PGW-U may store the actual IP address, and then should only report the IP Address if it had changed compared with earlier notification sent up to the PGW-C via OpenFlow.

Report of IP Address Withdrawn By the DHCP Server

In order to be able to report the IP address being withdrawn it is suggested that the PGW-C instructs the PGW-U via the OpenFlow controller to check the content of both the "ciaddr" and the "yiaddr" fields in any BOOTREPLY message (i.e. sent from the server to the client). If the content of "yiaddr" is equal to "0" then if the content of the "ciaddr" also "0" the IP address had been withdrawn from the UE. In that case this event is to be reported to the PGW-C via OpenFlow, in order the PGW-C to decide whether the session/bearer should be terminated.

As a further optimisation the PGW-U may remove the corresponding flow from the flow table and notify the PGW-C via OpenFlow accordingly.

Lease Timer Supervision

As it may be possible that some UE client may not behave in accordance with the DHCP specification, an additional security and charging supervision procedure is introduced in order to reject the fraudulent usage of resources by the UE. In general IP addresses are only assigned to the UE for specific lease time. Before expiration of the lease time, the UE should request the DHCP server to prolong the session. But, if the UE did not request for a longer lease time, the network shall be aware and be able to terminate the usage of the GTP-bearer.

In order to solve this problem either a) the DHCP server reports the lease time to the OFCS (Offline Charging System) and/or OCS (Online Charging System) which shall supervise possible abuse, or b) the PGW-C shall instruct the PGW-U via the OFC to match and extract the lease time being signalled in the "rebinding (T2) Time value" option (RFC1533) of the BOOTREPLY message, which assigned the IP address for the UE.

Additionally the PGW-C requests the PGW-U to start an according timer on which expiry the PGW-C is notified about in order to be able to terminate the session and in order to avoid fraudulent usage.

The code for this option ("rebinding (T2) Time value") is 59, and its length is 4 (cf. RFC1533).

```
         Code  Len       T2 Interval
        +----+----+----+----+----+----+
        | 59 | 4  | t1 | t2 | t3 | t4 |
        +----+----+----+----+----+----+
```

It is to be noted that the PGW is just an example, since the GGSN, BRAS (Broadband Remote Access Server), BNG (Broadband Network Gateway) and SGSN also can be separated according to SDN principles and the invention revealed herewith.

PCO for PPP etc

If the PCO Additional parameters list contains the 0000H PPP for use with IP PDP type or IP PDN type the UE intends to allocate its IPv4 address itself via the GTP-U payload after the GTP Tunnel establishment, and in that case the SDN Controller PGW-C may expose itself to a security risk where the UE may possibly flood the SDN controller (e.g via OPenFLow or Forces) with high frequently sent messages like for instance.

C021H (LCP);
C023H (PAP) Password Authentication Protocol;
C223H (CHAP) Challenge Handshake Authentication Protocol; and
8021H (IPCP) IP Control Protocol.

via PPP.

For example only the handling of IPCP is described here. Usage of the LPC, PAP CHAP over PPP is not excluded, however. Anyhow, any protocol potentially allows the UE to flood the SDN controller and seriously damage the network. Means to remedy these threats are provided with this application.

IPv6CP Configuration Options allow negotiation of desirable IPv6 parameters in IPCP. If the IPCP is used as the NCP protocol then the UE may request the "interface identifier" configuration option. This Configuration Option provides a way to negotiate a unique, 64-bit interface identifier to be used for the address autoconfiguration at the local end of the link. Interface identifiers in IPv6 unicast addresses are used to identify interfaces on a link. They are required to be unique within a subnet prefix. Therefore the SDN controller PGW-C is interested in the identifier. Therefore the OpenFlow/ForCEs interface is augmented with new actions/mechanism to match on the "link identifier "configuration option" such that the SDN controller/PGW-C is informed about the "interface identifier", whereas other aspects of the protocol details may not be reported up to the control plane.

DHCPv6

A UE that has obtained an IPv6 address can use stateless DHCP to request other configuration information such as a list of DNS (Domain Name Service) recursive name servers or SIP (Session Initiation Protocol) servers, for instance via 000AH IP address allocation via NAS signaling in the PCO Additional parameters list of the CREATE Session Request. In that case the SDN Controller PGW-C may expose itself to a security risk where the UE may possibly flood the SDN controller (e.g via OPenFLow or Forces) with high frequently sent DHCPv6 messages like for instance Information Request message and Reply. For that the Open Flow protocol is enhanced such that the protocol can match information elements like the IA Address Option in the e.g. REPLY message to the INFORMATION—Request message in order to report/search for the IPv6 address. Router Advertisement message may also be not excluded.

Figure 11:
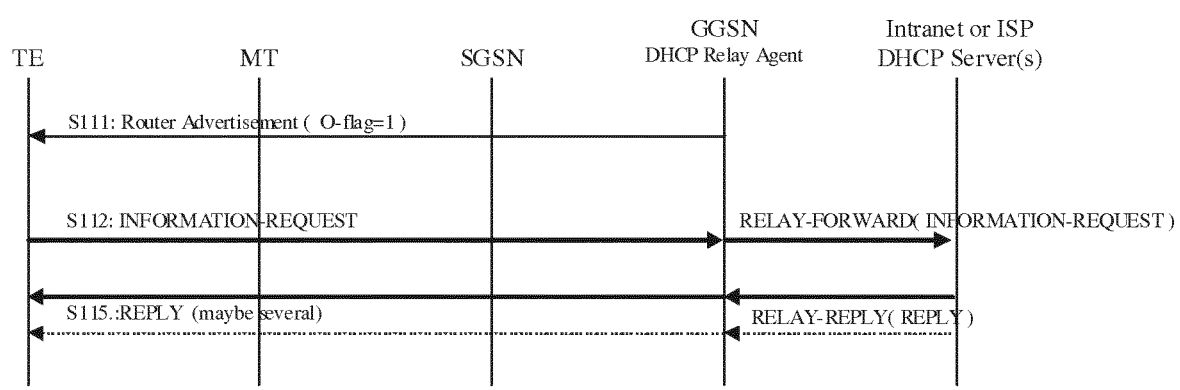
FIG. 11 is a signaling diagram illustrating a DHCP configuration signal flow according to the state of the art without SDN.

FIG. 11 is a signaling diagram illustrating a DHCP configuration signal flow as described in 3GPP TS 29.061 according to the state of the art without SDN.

In step S111, a Router Advertisement with the O-flag set, is sent from GGSN to TE to indicate to it to retrieve other configuration information.

In step S112, the TE sends an INFORMATION-REQUEST message with the IP destination address set to all_DHCP_Relay_Agents_and_Servers multicast address defined in the DHCPv6 IETF RFC 3315. The source address shall be the link-local address of the MS. The DHCP relay agent in the GGSN shall forward the message.

In step S113, the DHCP servers receiving the forwarded INFORMATION-REQUEST message, reply by sending a RELAY-REPLY message, with the "Relay Message" option including a REPLY message with the requested configuration parameters.

Further, as described in 3GPP TS 23.402 related to PMIP (Proxy Mobile IP), also the SGW may perform the DHCP relay function.

Figure 9:
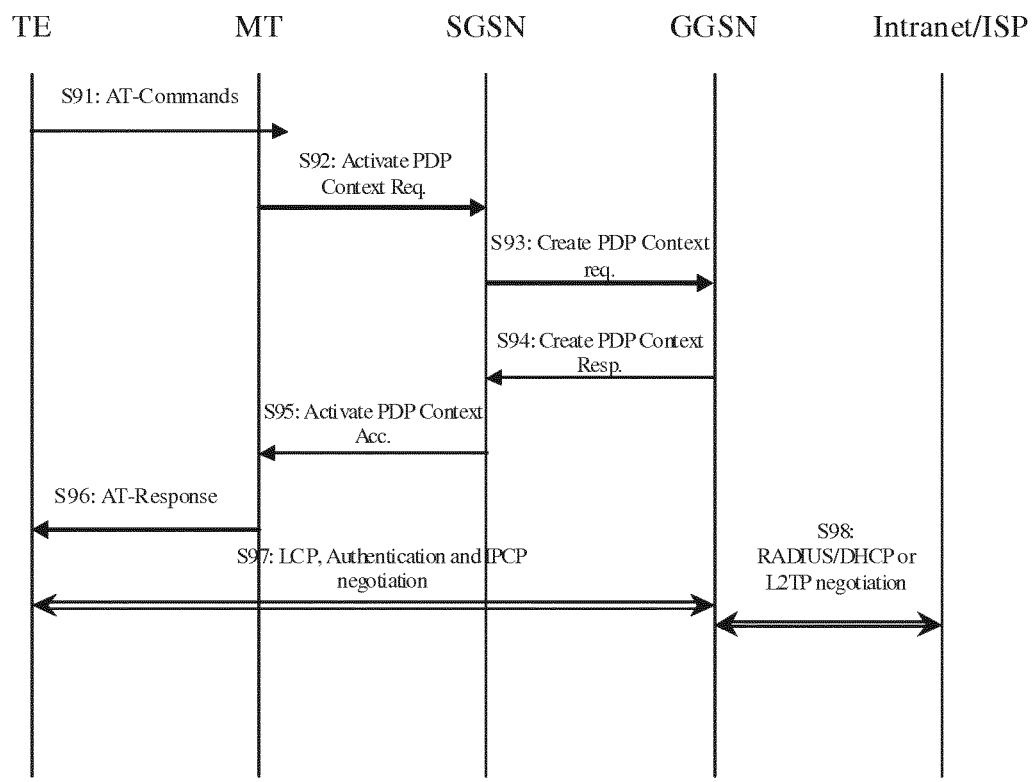
FIG. 9 is a signaling diagram illustrating an example of a successful PDP context activation.
Figure 10:
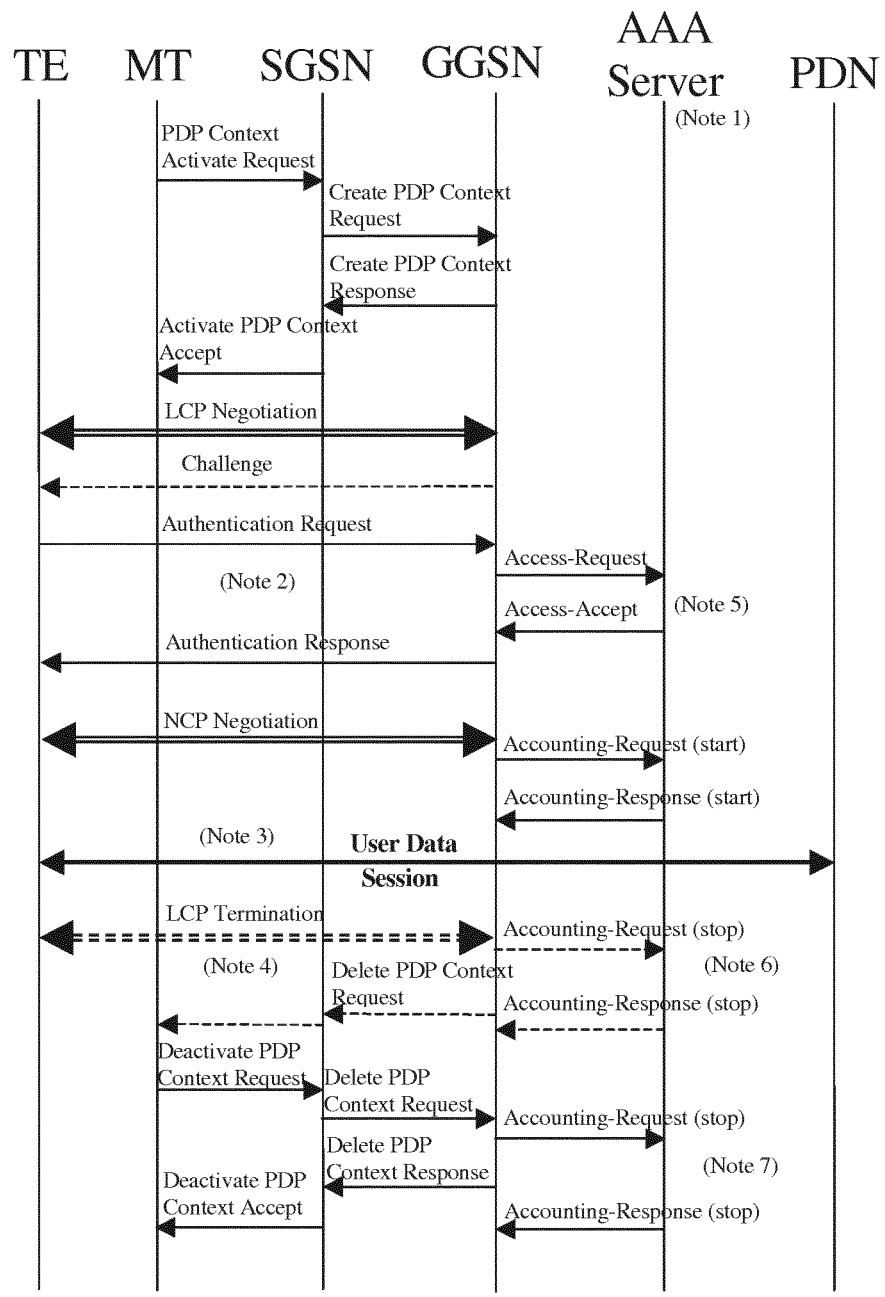
FIG. 10 is a signaling diagram illustrating an example of RADIUS message flows between a GGSN and an Authentication, Authorization and Accounting (AAA) server.

Furthermore it is to be noted that in FIG. 9, LCP, Authentication and IPCP negotiation are mapped to and from RADIUS/DHCP or L2TP negotiation. Therefore it is suggested to provide not only a simple DHCP relay in the user plane, but also, where appropriate, depending on the detailed instructions from the SDN controller/PGW-C, to implement the mapping from LCP or authentication or IPCP negotiation to RADIUS or DHCP or L2TP and vice versa.

In order to throttle and avoid flooding, it is proposed to add new proprietary information elements to the OpenFlow protocol, like for instance "Scan DHCPv4" or "Scan DHCPv6" and "DHCP throttling" in the ADDFlow/ModFlow of OpenFlow sent from the controller to the user plane.

For instance, the "Scan DHCP" indication shall instruct the user plane to evaluate the DHCP message for correctness and based on the "DHCP throttling" indication, the user plane shall not sent (and/or reduce) the DHCP messages up to the controller in case a certain threshold (signaled) of DHCP messages had been exceeded. Of course also an indication to remove the throttling is suggested.

However, additionally, a mechanism shall/may be implemented by which the controller is not impacted by malicious DHCP signaling at all. The principle of which are the following:
1) Specifying and placing new OpenFlow protocol elements such that the/an augmented OpenFlow Controller is able to request to forward GTP DHCP user plane content to an SDN based DHCP relay agent and by manipulating the DHCP protocol content by new OpenFlow rules on the User plane level in the PGW-U
2) Specifying and placing new OpenFlow protocol elements such that the/an augmented OpenFlow Controller is able to request a notification about the allocated IP address and the corresponding lease time, as well as being notified about any/the change of the assigned IP address.
3) Anyhow how the IP address assigned in step 2) might be reported to the PCRF (see FIG. 5), the PGW-C/OFC shall install rules such that the now newly assigned IP address is glued to the corresponding GTP Tunnel established (this mechanism in this step 3) is deemed to be state of the art, as this is already also to be supported in PGW-U anyhow even without DHCP relay function)

In this case, where the PGW-C/SDN controller is not notified about all DHCP messages or filtered DHCP messages there is no strong need to scan all the DHCP messages in the user plane and apply the throttling mechanism before forwarding the messages to the controller. That is because in that case the UE may only impact its own service if the UE sends DHCP messages at a very high rate (because consuming the bandwidth of its GTP tunnel for malicious DHCP signaling), since the SDN controller is not flooded. However since the User plane is transparent for DHCP signaling in that case, however, the controller is to be protected from to frequent IP address (and/or lease time indications) notifications. Therefore, it is suggested to introduce a new information element throttling number of IP address (lease timer) notification as well.

In general, it is noted that OpenFlow is just an example. Forces may be an alternative protocol.

PGW is also just an example as in general the GGSN provides the same functionality as the PGW.

The above description focussed on the PGW, however, it is of course possible to apply the solution to the decomposed SGW and the decomposed eNB. In principle the same mechanism can be applied at the eNB-C and the SGW-C, however, in the end the PGW-C also needs to have the IP address of the UE, so the same procedure is to be performed at the PGW again. But that means a waste of resources as the procedures would have been performed twice. Or alternatively, eNB-C or the SGW-C would sent the IP Address to the PGW-C (preferably via the GTP-C protocol Create Session request or something similar).

However the same procedures for extracting the IP address from DHCP protocol are performed.

DHCP v4 is just an example and DHCP v6 is another protocol to which the invention applies. Also alternatively the PPP and the RADIUS (Remote Authentication Dial In User Service) protocol or the L2TP (Layer 2 Tunneling Protocol) is another example.

For instance on receipt of a LCP (Link Control Protocol), Authentication and IPCP (IP Control Protocol) (PPP NCP (Network Control Protocol) for IPv4)) negotiation the corresponding signalling is to be mapped to the RADIUS/DHCP/L2TP (FIG. 9) (and vice versa in the reverse direction). Similar to the description for the plain DHCP relay function the SDN Controller/PGW-C/GGSN-C needs to be protected against attacks. For instance not all PPP signalling shall be forwarded to the SDN Controller/PGW-C/GGSN-C. However the IP address allocated to the UE and the lease time and etc shall be made available to the SDN Controller/PGW-C/GGSN-C by also evaluating the corresponding protocols carrying the said information and detecting and reporting the related information to the higher layer (SDN) controller/GGSN-C.

Furthermore the IP address itself is again just an example, the lease time for the IP address may be another example to be extracted/to be sent up to the controller.

Alternatively, instead of making use of the already known "Packet IN" message of the OpenFlow protocol, by which the whole DHCP message is sent up to the controller, the OpenFlow protocol may be changed such that only the IP address (or whatever information element may be of interest to the PGW-C) may be reported to the SDN controller. However, the throttling mechanism shall be applied regardless whether "packet IN" message or reporting of e.g. IP address or "lease time" or etc. is requested.

DHCP may again be just an example not only the PGW-C, but also the BRAS (Broadband Remote Access Server) may be an example for an application which relies on the SDN controller, and which SDN controller needs security protection from malicious UE signaling (PPPoE PPP over Ethernet, RADIUS).

DHCP Relay in the Control Plane

Figure 3:
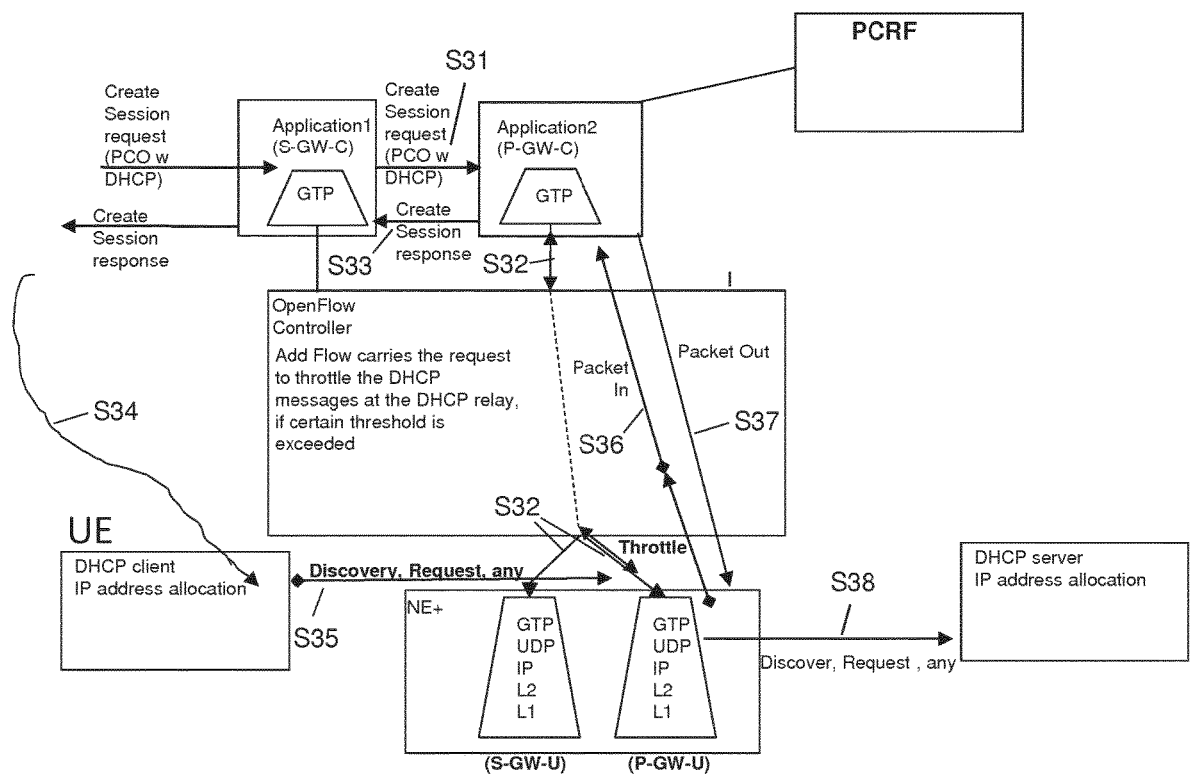
FIG. 3 is a diagram illustrating an example of DHCP relay in PGW-U instructed by PGW-C via OpenFlow Controller to throttle "Packet IN" messages, where the threshold is not reached.

FIG. 3 is a diagram illustrating an example of DHCP relay in PGW-U instructed by PGW-C via OpenFlow Controller to throttle "Packet IN" messages, where the threshold is not reached.

As can be seen in FIG. 3, on receipt of the 3GPP GTP-C (TS 29.274) Create Session request with the PCO set to e.g. "IPv4 address allocation via DHCPv4", (step S31), the PGW-C instructs the PGW-U via the SDN controller to compare the number of DHCP messages being sent by the UE with the "DHCP throttling" indication for instance set to "1 DHCP message per second" in the AddFlow or ModFlow of OpenFlow (step S32).

In that case, the PGW-U doesn't send all DHCP messages in the "Packet IN" message up to the controller in order to avoid overload. After the step S33 (Create session response) and after the UE has been reached via SGW and eNB (step S34), the UE may issue the DHCP DISCOVER message in order to obtain its IP address (step S35). Since this is the first DHCP Message, the PGW-U reports (as instructed) the Discovery message to the PGW-C via the SDN controller in the "Packet IN" message (step S36). It might be possible that the DHCP messages are kept with the SDN controller or not. The PGW-C or the SDN controller may instruct (step S37) the PGW-U to send the Discovery Message (step S38) by means of the Packet Out message of OpenFlow. Any following and/or responding DHCP message in general are handled similarly unless the threshold is not violated.

Figure 4:
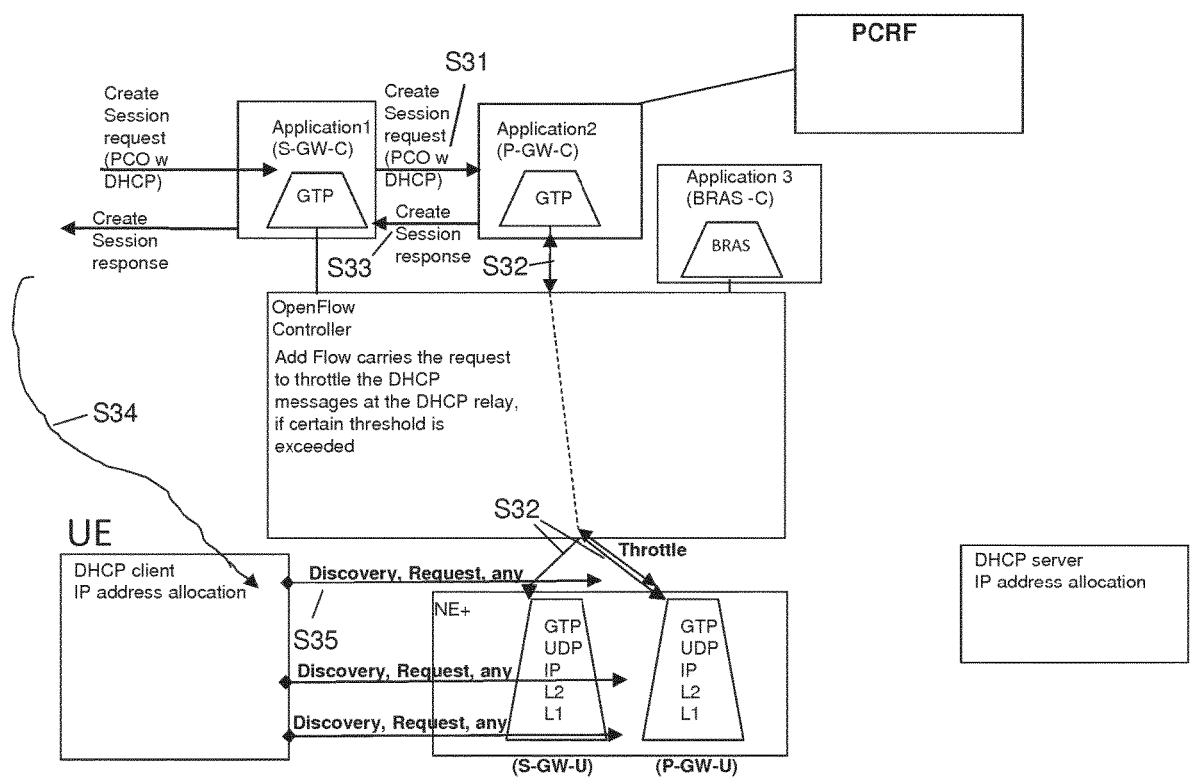
FIG. 4 is a diagram illustrating an example of DHCP relay in PGW-U instructed by PGW-C via OpenFlow Controller to throttle "Packet IN" messages, where the threshold is reached and there is no "Packet IN" message.

FIG. 4 is a diagram illustrating an example of DHCP relay in PGW-U instructed by PGW-C via OpenFlow Controller to throttle "Packet IN" messages, where the threshold is reached and there is no "Packet IN" message.

As shown in FIG. 4, multiple DISCOVERY messages (or any other DHCP messages like REQUEST etc.) are sent in step S35, thus violating the threshold as indicated by the SDN controller to the PGW-U. Consequently, these messages are discarded by the PGW-U plane without impacting and bothering the SDN controller. It is noted that steps S31 to S35 in FIG. 4 correspond to steps S31 to S35 in FIG. 3 and a repeated description thereof is omitted.

Furthermore and in addition, the SDN controller can also be protected by requesting the User plane to scan the DHCP message (with e.g. "Scan DHCP") such that malformed message are ignored and therefore, the SDN controller is not bothered or the malicious information elements are removed before forwarded to the controller, as already described above).

DHCP Relay in the User Plane

Figure 5:
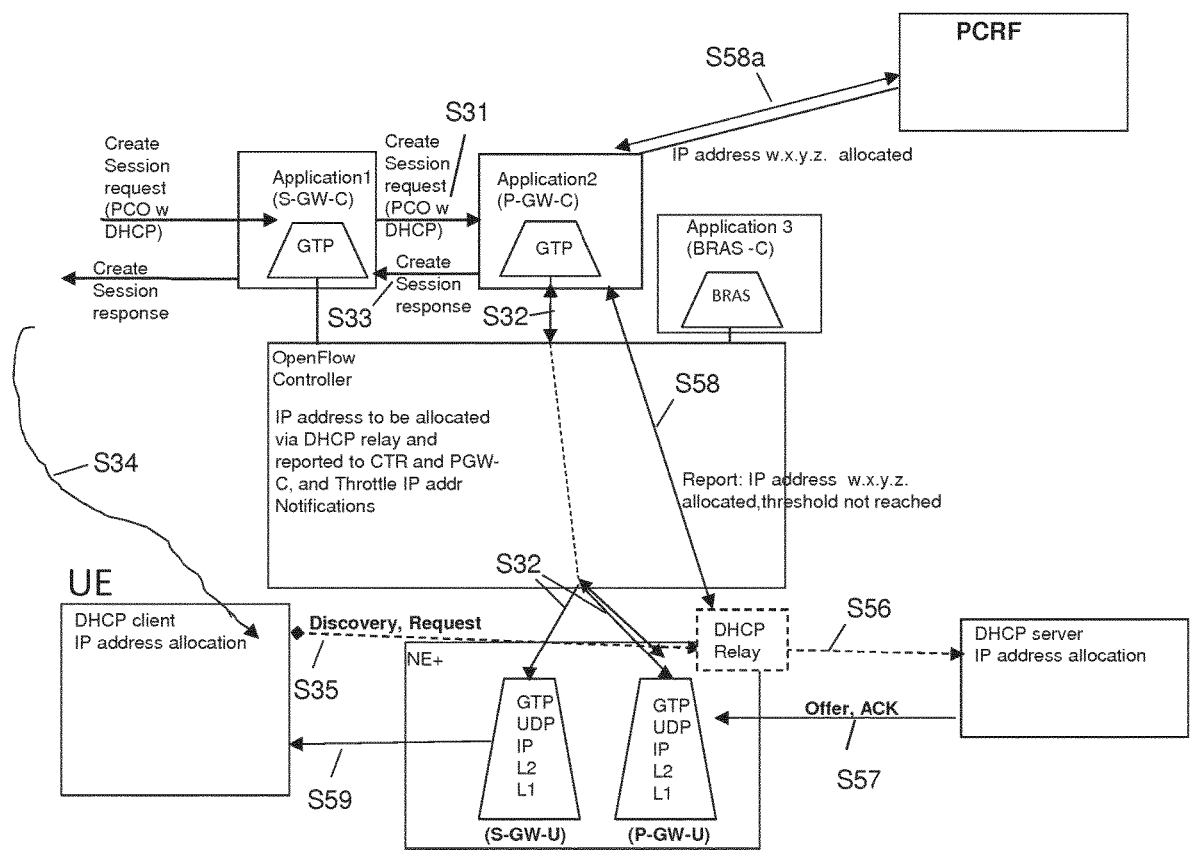
FIG. 5 is a diagram illustrating DHCP relay in PGW-U instructed by PGW-C via OpenFlow Controller to modify DHCP protocol and to report the allocated IP Address to PGW-C, where the threshold is not reached.

FIG. 5 is a diagram illustrating DHCP relay in PGW-U instructed by PGW-C via OpenFlow Controller to modify DHCP protocol and to report the allocated IP address to the PGW-C for later usage (e.g. for Charging and etc.), where the threshold is not reached.

Alternatively to the above, the User plane, instead of sending all DHCP messages to the controller and receiving all DHCP messages from the controller, may be instructed to only report the IP address or the Lease time being detected in the DHCP offer, as depicted in FIG. 5. In this regard, in order to keep the corresponding message on the PGW-U level, it is necessary that the GTP Tunnel is correlated with the possible multiple different DHCP destination servers. To accomplish this, the SDN controller needs to instruct the PGW-U to correlate before a match can be detected and reported to the controller.

In this case, the DHCP messages are completely kept in the User plane and in that case, the SDN controller is also protected by the "Threshold indication" in a similar way, since even in this case the SDN controller may be flooded and impacted by malicious behavior if the controller is notified about e.g. the IP address to frequently.

If the UE requests the IPv4 address allocation via DHCPv4 within the PCO (protocol configuration option) in the Create session request message or the "PDN connectivity" message, the PGW-C is suggested to request the DHCP relay function to be invoked via the OpenFlow controller at the PGW-U. Furthermore the PGW-C shall request via the OFC the PGW-U to report the allocation and de-allocation of the IP address (see step S32 for more details).

For that, new rules are suggested in the OpenFlow protocol such that the user plane is able to match the content of DHCP messages and to perform actions on the DHCP messages.

As the DHCP relay agent for the UE shall be allocated together with the allocation of the e.g. GTP tunnel, the request for reporting the IP address (allocation/de-allocation) to the OFC and the PGW-C can preferable be carried along with normal SDN messages like MOD-Flow or ADD-Flow, which already needs to be exchanged between the Application and the Controller in order to setup the GTP Tunnel and/or IP Tunnel, etc.

It is to be noted here that the DHCP is again also just one example of one particular application, because one may think of any other application as well which are able to take advantages from the current invention.

In order to fully support the DHCP relay procedures the following is invented.

The DHCP signaling messages are sent and evaluated on the payload level only, as the DHCP rides on IP and GTP level respectively in the PGW-U.

As can be seen from FIG. 5, the PGW-C requests the PGW-U via the SDN controller to perform the DHCP relay functionality within the user plane as highlighted in the step S32 and additionally instructs the user plane to throttle the notification of the IP address (and the Lease time) if a certain threshold is exceeded. Furthermore, in the step S56, the DHCP Relay function in the PGW-U correlates the GTP-U tunnel with one or more external DHCP servers on the user plane and forwards the possibly modified DHCP signaling (to allow correlation) directly to the DHCP server (instead of informing the controller). On the receipt of the response from the DHCP server in step S57, the DHCP relay function copies the IP Address and the Lease time and reports this to the controller in step S58, if threshold was not exceeded. PCRF is informed in step S58a about the IP Address etc. Simultaneously with step S58, the DHCP signaling is forwarded towards the UE in step S59.

It is noted that steps S31 to S35 in FIG. 5 correspond to steps S31 to S35 in FIG. 3 and a repeated description thereof is omitted.

If the threshold would have been exceeded, the notification (step S58) is suppressed, and step S59 is also suppressed.

Note that the IP address and the Lease Time are just some examples of information the controller may be interested in.

Furthermore and in addition, the SDN controller can also be protected by requesting the User plane to scan the DHCP message such that malformed message are ignored and therefore the SDN controller is not bothered or the malicious information elements are removed before forwarded to the controller, as depicted in FIG. 3.

In view of the above, according to some example versions of the present invention, network security is ensured since the SDN controller cannot be attacked in the SDN environment.

In the following, a more general description of example versions of the present invention is made with respect to FIGS. 6 to 8.

Figure 6:
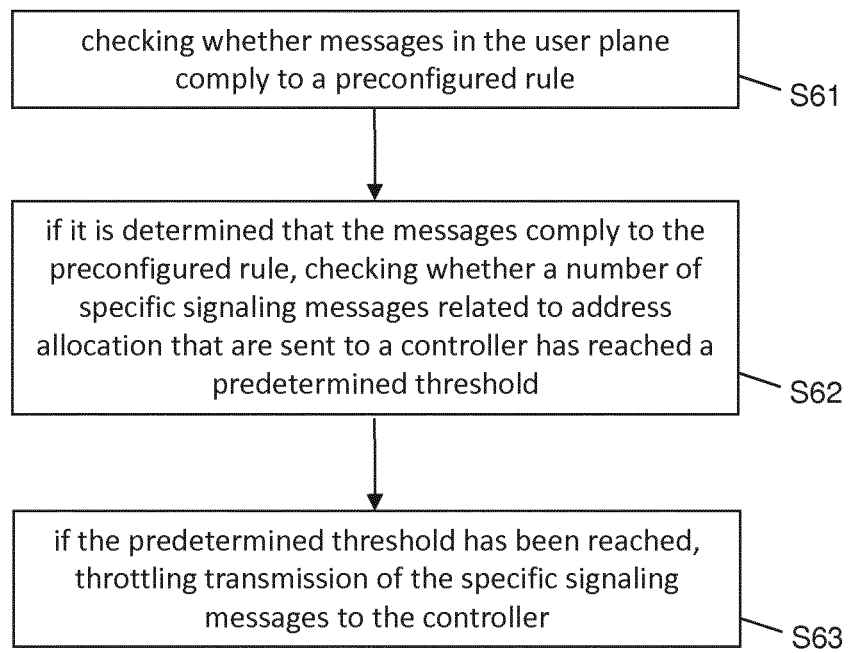
FIG. 6 is a flowchart illustrating an example of a method according to some example versions of the present invention.

FIG. 6 is a flowchart illustrating an example of a method according to example versions of the present invention.

According to some example versions of the present invention, the method may be implemented in or may be part of a network element in a user plane like for example, a PGW-U or the like. The method comprises checking whether messages in the user plane comply to a preconfigured rule in a step S61. If it is determined in step S61 that the messages comply to the preconfigured rule, the method further comprises checking whether a number of specific signaling messages related to address allocation that are sent to a controller has reached a predetermined threshold in a step S62, and if the predetermined threshold has been reached, throttling transmission of the specific signaling messages to the controller in a step S63.

According to some example versions of the present invention, throttling comprises reducing the transmission of the specific signaling messages and completely stopping the transmission of the specific signaling messages to the controller.

According to some example versions of the present invention, the method further comprises, if the predetermined threshold has not been reached, transmitting the specific signaling messages to the controller, and if the specific threshold has been reached and the transmission has been throttled, resuming transmission of the specific signaling messages upon request from the controller.

According to some example versions of the present invention, the method further comprises searching for specific signaling messages carrying the specific information, extracting specific information from the specific signaling messages, and transmitting the extracted specific information to the controller.

According to some example versions of the present invention, the specific signaling messages are signaling messages according to one of Dynamic Host Configuration Protocol, DHCP, Remote Authentication Dial-In User Service, RADIUS, Layer 2 Tunneling Protocol, L2TP, and Point-to-Point Protocol, PPP.

According to some example versions of the present invention, the method further comprises transmitting the specific information via a DHCP relay or LCP/Authentication/IPCP negotiation to RADIUS/DHCP/L2TP mapping functionality.

According to some example versions of the present invention, the specific information is an internet protocol address or a lease time of the internet protocol address.

According to some example versions of the present invention, the messages in the user plane comply to the preconfigured rule when the messages comply to the dynamic host configuration, RADIUS, L2TP, or PPP protocol.

According to some example versions of the present invention, the controller conforms to one of OpenFlow protocol or Forwarding and Control Element Separation Protocol.

Figure 7:
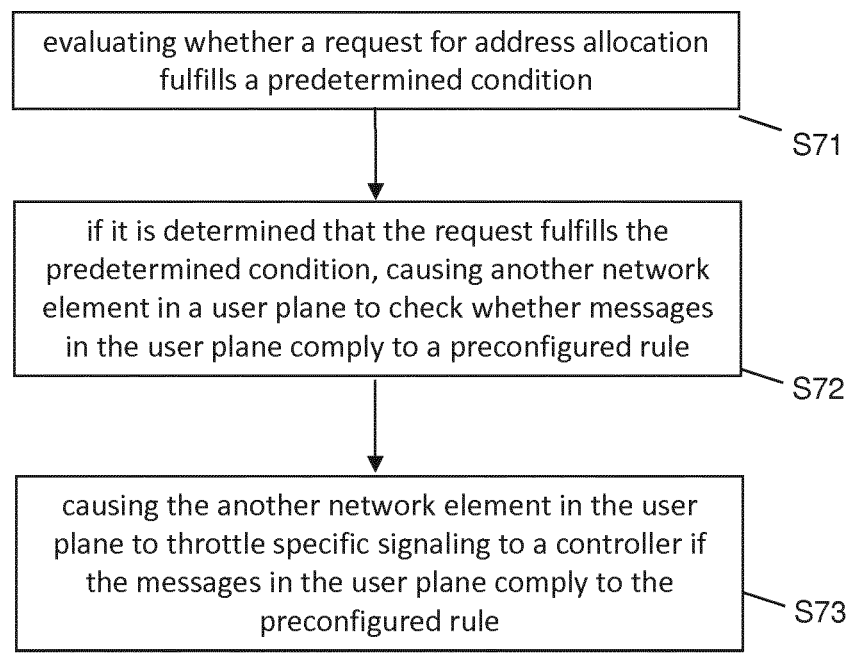
FIG. 7 is a flowchart illustrating another example of a method according to some example versions of the present invention.

FIG. 7 is a flowchart illustrating another example of a method according to example versions of the present invention.

According to some example versions of the present invention, the method may be implemented in or may be part of a network element like for example, a PGW-C or a SDN controller or the like. The method comprises evaluating whether a request for address allocation fulfills a predetermined condition in a step S71. If it is determined in step S71 that the request fulfills the predetermined condition, the method further comprises causing another network element in a user plane to check whether messages in the user plane comply to a preconfigured rule in a step S72, and causing the another network element in the user plane to throttle specific signaling messages to a controller if the messages in the user plane comply to the preconfigured rule in a step S73.

According to some example versions of the present invention, throttling comprises reducing the transmission of the specific signaling messages and completely stopping the transmission of the specific signaling messages to the controller.

According to some example versions of the present invention, the predetermined condition includes that the address allocation has been requested via one of Dynamic Host Configuration Protocol, DHCP, Remote Authentication Dial-In User Service, RADIUS, Layer 2 Tunneling Protocol, L2TP, or Point-to-Point Protocol, PPP.

According to some example versions of the present invention, the address allocation is requested by an element which is at least equipment for performing machine type communication, like user equipment, or a server or the like. Further, the element requesting the address allocation may be any kind of sensors, Smart Wearables (Clothes), or any kind of equipment related to Mobile Video Surveillance, autonomous driving, Tactile Internet, Robotic control and their corresponding application counterparts possibly residing on servers in the cloud, in the local and/or remote, centralized or distributed data centers.

According to some example versions of the present invention, the preconfigured rule includes that the message in the user plane is a message conforming to one of Dynamic Host Configuration Protocol, DHCP, Remote Authentication Dial-In User Service, RADIUS, Layer 2 Tunneling Protocol, L2TP, or Point-to-Point Protocol, PPP.

According to some example versions of the present invention, the address allocation is requested via a General Packet Radio Service Tunneling Protocol control plane, GTP-C, in a Create session request message.

According to some example versions of the present invention, the address allocation is requested via a Gateway General Packet Radio Service Support Node, GGSN, in a Create Packet Data Protocol, PDP, Context Request message.

According to some example versions of the present invention, the method further comprises evaluating whether the address allocation is requested via one of DHCP, Link Control Protocol, LCP, Password Authentication Protocol, PAP, Challenge Handshake Authentication Protocol, CHAP, and Internet Protocol Control Protocol, IPCP in a Protocol Configuration Option, PCO.

Figure 8:
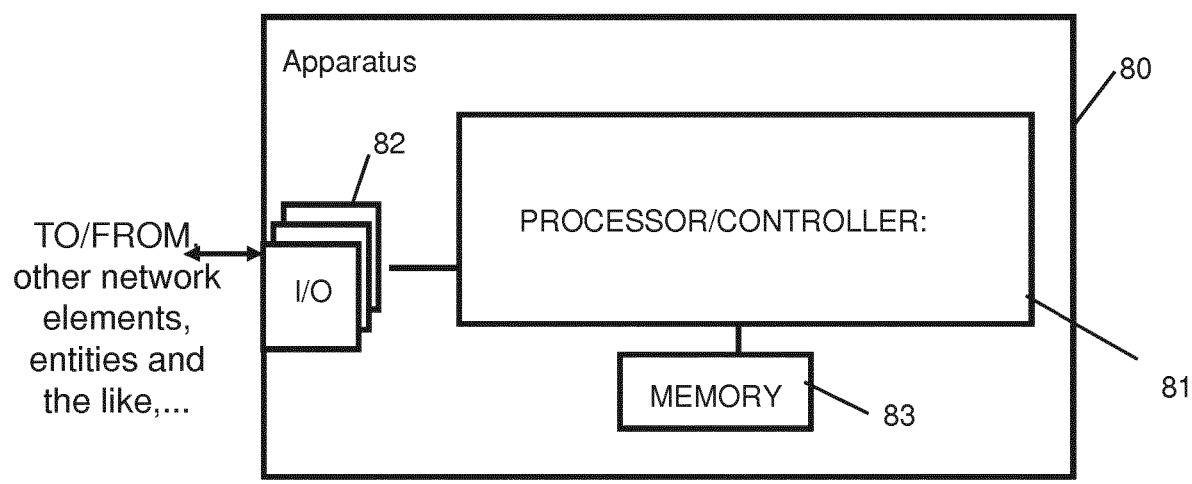
FIG. 8 is a block diagram illustrating an example of an apparatus according to some example versions of the present invention.

FIG. 8 is a block diagram illustrating an example of an apparatus according to some example versions of the present invention.

In FIG. 8, a block circuit diagram illustrating a configuration of an apparatus 80 is shown, which is configured to implement the above described aspects of the invention. It is to be noted that the apparatus 80 shown in FIG. 8 may comprise several further elements or functions besides those described herein below, which are omitted herein for the sake of simplicity as they are not essential for understanding the invention. Furthermore, the apparatus may be also another device having a similar function, such as a chipset, a chip, a module etc., which can also be part of an apparatus or attached as a separate element to the apparatus, or the like.

The apparatus 80 may comprise a processing function or processor 81, such as a CPU or the like, which executes instructions given by programs or the like. The processor 81 may comprise one or more processing portions dedicated to specific processing as described below, or the processing may be run in a single processor. Portions for executing such specific processing may be also provided as discrete elements or within one or further processors or processing portions, such as in one physical processor like a CPU or in several physical entities, for example. Reference sign 82 denotes transceiver or input/output (I/O) units (interfaces) connected to the processor 81. The I/O units 82 may be used for communicating with one or more other network elements, entities, terminals or the like. The I/O units 82 may be a combined unit comprising communication equipment towards several network elements, or may comprise a distributed structure with a plurality of different interfaces for different network elements. The apparatus 80 further comprises at least one memory 83 usable, for example, for storing data and programs to be executed by the processor 81 and/or as a working storage of the processor 81.

The processor 81 is configured to execute processing related to the above described aspects. In particular, the apparatus 80 may be implemented in or may be part of a network element in a user plane like, for example, a PGW-U or the like, and may be configured to perform a method as described in connection with FIG. 6. Thus, the processor 81 is configured to perform checking whether messages in the user plane comply to a preconfigured rule, and if it is determined that the messages comply to the preconfigured rule, checking whether a number of specific signaling messages related to address allocation that are sent to a controller has reached a predetermined threshold, and if the predetermined threshold has been reached, throttling transmission of the specific signaling messages to the controller.

According to some example versions of the present invention, the apparatus 80 may be implemented in or may be part of a network element like, for example, PGW-C or a SDN controller or the like, and may be configured to perform a method as described in connection with FIG. 7. Thus, the processor 81 is configured to perform evaluating whether a request for address allocation fulfills a predetermined condition, if it is determined that the request fulfills the predetermined condition, causing another network element in a user plane to check whether messages in the user plane comply to a preconfigured rule, and causing the another network element in the user plane to throttle specific signaling messages to a controller if the messages in the user plane comply to the preconfigured rule.

For further details regarding the functions of the apparatus 80, reference is made to the description of the methods according to some example versions of the present invention as described in connection with FIGS. 6 and 7.

Thus, it is noted that the apparatus for use in a network element in a user pane, and the apparatus for use in a network element, generally have the same structural components, wherein these components are configured to execute the respective functions of the network elements, respectively, as set out above.

In the foregoing exemplary description of the apparatus, only the units/means that are relevant for understanding the principles of the invention have been described using functional blocks. The apparatus may comprise further units/means that are necessary for its respective operation, respectively. However, a description of these units/means is omitted in this specification. The arrangement of the functional blocks of the apparatus is not construed to limit the invention, and the functions may be performed by one block or further split into sub-blocks.

When in the foregoing description it is stated that the apparatus (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

For the purpose of the present invention as described herein above, it should be noted that method steps likely to be implemented as software code portions and being run using a processor at an apparatus (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the aspects/embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the aspects/embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective units/means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

It is noted that the aspects/embodiments and general and specific examples described above are provided for illustrative purposes only and are in no way intended that the present invention is restricted thereto. Rather, it is the intention that all variations and modifications which fall within the scope of the appended claims are covered.

The invention claimed is:

1. A method for use in a network element in a user plane, said method comprising:
    checking whether messages in the user plane comply to a preconfigured rule, wherein the messages in the user plane comply to the preconfigured rule when the messages comply to one of Dynamic Host Configuration Protocol (DHCP), Remote Authentication Dial-In User Service (RADIUS), Layer 2 Tunneling Protocol (L2TP), and Point-to-Point Protocol (PPP); and if it is determined that the messages comply to the preconfigured rule, checking whether a number of specific signaling messages, according to one of DHCP, RADIUS, L2TP, and PPP, related to address allocation that are sent to a controller has reached a predetermined threshold; and if the predetermined threshold has been reached, reducing transmission of the specific signaling messages to the controller, and if the predetermined threshold has not been reached, transmitting the specific signaling messages to the controller; and if the specific threshold has been reached and the transmission has been throttled, resuming transmission of the specific signaling messages upon request from the controller.

2. The method according to claim 1, further comprising:

searching for specific signaling messages carrying the specific information;

extracting specific information from the specific signaling messages; and transmitting the extracted specific information to the controller.

3. The method according to claim 2, further comprising:

transmitting the specific information via a DHCP relay or LCP/Authentication/IPCP negotiation to RADIUS/DHCP/L2TP mapping functionality, wherein the specific information comprises an internet protocol address or a lease time of the internet protocol address.

4. The method according to claim 1, wherein the controller conforms to one of OpenFlow protocol or Forwarding and Control Element Separation Protocol.

5. A method for use in a network element, said method comprising:

evaluating whether a request for address allocation fulfills a predetermined condition, wherein the predetermined condition includes that the address allocation has been requested via one of Dynamic Host Configuration Protocol (DHCP), Remote Authentication Dial-In User Service (RADIUS), Layer 2 Tunneling Protocol (L2TP), or Point-to-Point Protocol (PPP);

if it is determined that the request fulfills the predetermined condition, causing another network element in a user plane to check whether messages in the user plane comply to a preconfigured rule, wherein the preconfigured rule includes that the message in the user plane is a message conforming to one of DHCP, RADIUS, L2TP, or PPP; and causing the another network element in the user plane to reduce specific signaling messages, according to one of DHCP, RADIUS, L2TP, and PPP, related to address allocation to a controller if the messages in the user plane comply with the preconfigured rule, and if it is determined that the request does not fulfill the predetermined condition, causing the another network element in the user plane to transmit the specific signaling messages to the controller; and if the predetermined condition has been reached and the transmission has been throttled, causing transmission of the specific signaling messages to resume upon request from the controller.

6. The method according to claim 5, wherein the address allocation is requested via a General Packet Radio Service Tunneling Protocol control plane, GTP-C, in a Create session request message; or wherein the address allocation is requested via a Gateway General Packet Radio Service Support Node, GGSN, in a Create Packet Data Protocol, PDP, Context Request message; or the method further comprises evaluating whether the address allocation is requested via one of DHCP, Link Control Protocol (LCP), Password Authentication Protocol (PAP), Challenge Handshake Authentication Protocol (CHAP), and Internet Protocol Control Protocol (IPCP) in a Protocol Configuration Option (PCO).

7. An apparatus for use in a network element in a user plane, said apparatus comprising:

at least one processor; and at least one memory for storing instructions to be executed by the processor, wherein the at least one memory and the instructions are configured to, with the at least one processor, cause the apparatus at least to perform checking whether messages in the user plane comply to a preconfigured rule, wherein the messages in the user plane comply with the preconfigured rule when the messages comply to one of Dynamic Host Configuration Protocol (DHCP), Remote Authentication Dial-In User Service (RADIUS), Layer 2 Tunneling Protocol (L2TP), and Point-to-Point Protocol (PPP), and if it is determined that the messages comply to the preconfigured rule, checking whether a number of specific signaling messages, according to one of DHCP, RADIUS, L2TP, and PPP, related to address allocation that are sent to a controller has reached a predetermined threshold, and if the predetermined threshold has been reached, reducing transmission of the specific signaling messages to the controller, and if the predetermined threshold has not been reached, transmitting the specific signaling messages to the controller, and if the specific threshold has been reached and the transmission has been throttled, resuming transmission of the specific signaling messages upon request from the controller.

8. The apparatus according to claim 7, wherein the at least one memory and the instructions are further configured to, with the at least one processor, cause the apparatus at least to perform:

searching for specific signaling messages carrying the specific information, extracting specific information from the specific signaling messages, and transmitting the extracted specific information to the controller.

9. The apparatus according to claim 8, wherein the at least one memory and the instructions are further configured to, with the at least one processor, cause the apparatus at least to perform:

transmitting the specific information via a DHCP relay or LCP/Authentication/IPCP negotiation to RADIUS/DHCP/L2TP mapping functionality, wherein the specific information is an internet protocol address or a lease time of the internet protocol address.

10. The apparatus according to claim 7, wherein the controller conforms to one of OpenFlow protocol or Forwarding and Control Element Separation Protocol.

11. An apparatus for use in a network element, comprising:

at least one processor; and at least one memory for storing instructions to be executed by the processor, wherein the at least one memory and the instructions are configured to, with the at least one processor, cause the apparatus at least to perform:

evaluating whether a request for address allocation fulfills a predetermined condition, wherein the predetermined condition includes that the address allocation has been requested via one of Dynamic Host Configuration Protocol (DHCP), Remote Authentication Dial-In User Service (RADIUS), Layer 2 Tunneling Protocol (L2TP), or Point-to-Point Protocol (PPP), if it is determined that the request fulfills the predetermined condition, causing another network element in a user plane to check whether messages in the user plane comply to a preconfigured rule, wherein the preconfigured rule includes that the message in the user plane is a message conforming to one of DHCP, RADIUS, L2TP, or PPP, and causing an indication to the another network element in the user plane to reduce specific signaling messages, according to one of DHCP, RADIUS, L2TP, and PPP, related to address allocation to a controller if the messages in the user plane comply to the preconfigured rule, and if it is determined that the request does not fulfill the predetermined condition, causing the another network element in the user plane to transmit the specific signaling messages to the controller; and if the predetermined condition has been reached and the transmission has been throttled, causing transmission of the specific signaling messages to resume upon request from the controller.

12. The apparatus according to claim 11, wherein
the address allocation is requested via a General Packet Radio Service Tunneling Protocol control plane (GTP-C), in a Create session request message; or wherein the address allocation is requested via a Gateway General Packet Radio Service Support Node (GGSN), in a Create Packet Data Protocol (PDP), Context Request message; or wherein the at least one memory and the instructions are further configured to, with the at least one processor, cause the apparatus at least to perform:

evaluating whether the address allocation is requested via one of DHCP, Link Control Protocol (LCP), Password Authentication Protocol (PAP), Challenge Handshake Authentication Protocol (CHAP), and Internet Protocol Control Protocol (IPCP) in a Protocol Configuration Option (PCO).

13. A computer program product embodied on a non-transitory computer-readable medium, said product including a program for a processing device, comprising software code portions for performing a method, the method comprising:

checking whether messages in the user plane comply to a preconfigured rule, wherein the messages in the user plane comply to the preconfigured rule when the messages comply to one of Dynamic Host Configuration Protocol (DHCP), Remote Authentication Dial-In User Service (RADIUS), Layer 2 Tunneling Protocol (L2TP), and Point-to-Point Protocol (PPP); and if it is determined that the messages comply to the preconfigured rule, checking whether a number of specific signaling messages, according to one of DHCP, RADIUS, L2TP, and PPP, related to address allocation that are sent to a controller has reached a predetermined threshold; and if the predetermined threshold has been reached, reducing transmission of the specific signaling messages to the controller, and if the predetermined threshold has not been reached, transmitting the specific signaling messages to the controller; and if the specific threshold has been reached and the transmission has been throttled, resuming transmission of the specific signaling messages upon request from the controller.

* * * * *